United States Patent Office 2,870,197
Patented Jan. 20, 1959

2,870,197

4,4'-DISUBSTITUTED-C₄₀-CAROTENOIDS AND THEIR PREPARATION

Otto Isler, Basel, Herbert Lindlar, Reinach, Basel-Land, Marc Montavon and Rudolf Rüegg, Basel, and Paul Zeller, Neuallschwil, Switzerland, assignors to Hoffmann-La Roche, Inc., Nutley, N. J., a corporation of New Jersey No Drawing. Application December 15, 1955
Serial No. 553,217

Claims priority, application Switzerland
December 24, 1954

14 Claims. (Cl. 260—488)

This invention relates to novel chemical compounds and to novel methods for preparing them. More particularly, the invention is concerned with a class of substances generically designated as 4,4'-disubstituted-β-carotene; with novel syntheses of 4,4'-disubstituted-β-carotene; and with novel intermediates useful in said syntheses. [In those nomenclatures employed in the instant disclosure wherein 4,4'-disubstituted-C₄₀-carotenoid compounds are named on the basis of carotene as a reference structure, the numbers are applied to the forty carbon atoms of the fundamental carotene carbon skeleton according to the numbering system shown in Liebigs Annalen der Chemie, volume 573, page 3 (1951), as a model.]

In one briefly described aspect, the invention provides a process of making 4,4'-disubstituted-β-carotene which comprises condensing acetylene with 8-(2,6,6-trimethyl-2-cyclohexen-1-ylidene)-2,6-dimethyl-2,4,6-octatrien-1-al (stepwise, or in a single operation) thereby producing 1,18-di-(2,6,6-trimethyl-2-cyclohexen-1-ylidene)-3,7,12,16-tetramethyl-8,11-dihydroxy-2,4,6,12,14,16-octadecahexaen-9-yne; converting the latter to 4,4'-disubstituted-15,15'-dehydro-β-carotene; partially hydrogenating the latter at the triple bond thereby producing 4,4'-disubstituted-15,15'-mono-cis-β-carotene; and isomerizing the latter thereby producing all-trans-4,4'-disubstituted-β-carotene.

A comprehensive embodiment of the invention comprises condensing acetylene with approximately two molar proportions of 8-(2,6,6-trimethyl-2-cyclohexen-1-ylidene)-2,6-dimethyl-2,4,6-octatrien-1-al (either in a single operation, wherein one mole of the aldehyde is condensed with each of the reactive hydrogen atoms in acetylene by means of a bilateral metal-organic reaction; or stepwise, wherein one mole of the aldehyde is condensed with one mol of acetylene by a metal-organic reaction thereby producing 10-(2,6,6-trimethyl-2-cyclohexen-1-ylidene)-4,8-dimethyl-4,6,8-decatrien-1-yn-3-ol, which latter is then condensed with a second mol of the aldehyde by means of a metal-organic reaction) thereby producing 1,18-di-(2,6,6-trimethyl-2-cyclohexen-1-ylidene)-3,7,12,16-tetramethyl-8,11-dihydroxy-2,4,6,12,14,16-octadecahexaen-9-yne; halogenating the latter (for example, by reacting with hydrogen halide, preferably concentrated aqueous hydrochloric acid or concentrated aqueous hydrobromic acid) thereby effecting replacement of the 8- and 11-hydroxyl groups by halogen atoms, with concomitant allyl rearrangement; and thereby producing 4,4'-dihalo-15,15'-dehydro-β-carotene; replacing each of the halogen atoms in the latter by a hydroxy group or a lower alkanoyloxy group or an oxo group; reacting the resulting 4,4'-dihydroxy-[or 4,4'-di(lower alkanoyloxy)-or 4,4'-dioxo-] 15,15'-dehydro-β-carotene with about one molar proportion of hydrogen in the presence of a hydrogenation catalyst selective to catalyze the hydrogenation of an acetylenic linkage only to the olefinic stage thereby producing 4,4'-dihydroxy-[or 4,4'-di(lower alkanoyloxy)-or 4,4'-dioxo] 15,15'-mono-cis-β-carotene; and isomerizing the latter thereby producing all-trans-4,4'-dihydroxy-[or 4,4'-di(lower alkanoyloxy)- or 4,4'-dioxo-] β-carotene; it being understood that hydroxy and lower alkanoyloxy can be converted one to the other, and hydroxy and oxo can be converted one to the other, at any stage, either before or after selective hydrogenation or before or after isomerization.

In the first stage of the process according to the invention, acetylene is condensed bilaterally with 8-(2,6,6-trimethyl-2-cyclohexen-1-ylidene)-2,6-dimethyl-2,4,6-octatrien-1-al by means of a metal-organic condensation. An appropriate embodiment comprises condensing acetylene dimagnesium halide with about two molar proportions of 8-(2 6,6-trimethyl-2-cyclohexen-1-ylidene)-2,6-dimethyl-2,4,6-octatrien-1-al by means of a Grignard reaction. Acetylene dimagnesium halide can be prepared in known manner by the action of acetylene on a solution of lower alkyl magnesium halide in an inert solvent. Preferably, an ethereal solution of lower alkyl magnesium halide is stirred or shaken in an acetylene atmosphere for for several hours. Suitable species of lower alkyl magnesium halide are, for example, ethyl-, butyl- and n-hexyl-magnesium-bromides and -chlorides. In this reaction, the acetylene dimagnesium halide produced separates as a heavy oil or as a solid. It is appropriate then to add two molar proportions of 8-(2,6,6-trimethyl-2-cyclohexen-1-ylidene)-2,6 dimethyl-2,4,6-octatrien-1-al, dissolved in an inert solvent, preferably diethyl ether, to the well stirred suspension of the acetylene dimagnesium halide, and to stir the mixture for several hours at room temperature or at the reflux temperature of the solvent. Upon hydrolysis of the condensation product, there is obtained 1,18-di-(2,6,6-trimethyl-2-cyclohexen-1-ylidene)-3,7,12,16-tetramethyl-8,11-dihydroxy-2,4,6,12,14,16-octadecahexaen-9-yne as a very viscid material.

An alternative mode of execution of the first stage of the process of the invention comprises reacting approximately one molar proportion of 8-(2,6,6-trimethyl-2-cyclohexen-1-ylidene)-2,6-dimethyl-2,4,6-octatrien-1-al in liquid ammonia with one molar proportion of an alkali metal- or alkaline earth metal-acetylide and reacting the condensation product obtained, advantageously after hydrolysis to 10-(2,6,6-trimethyl-2-cyclohexen-1-ylidene)-4,8-dimethyl-4,6,8-decatrien-1-yn-3-ol, by means of a metal-organic reaction with a second approximately molar proportion of 8-(2,6,6-trimethyl-2-cyclohexen-1-ylidene)-2,6-dimethyl-2,4,6-octatrien-1-al. The condensation in liquid ammonia can be executed either at elevated pressures and room temperature, or under normal pressures at the boiling temperature of the ammonia. Preferably, lithium acetylide is employed in the condensation. The 8-(2,6,6-trimethyl-2-cyclohexen-1-ylidene)2,6-dimethyl-2,4,6-octatrien-1-al can be added in solution in an inert solvent, for example, diethyl ether. The condensation product can best be hydrolyzed by addition of an ammonium salt before removal of the ammonia, or by addition of an acid after removal of the ammonia. Condensation of the 10-(2,6,6-trimethyl-2-cyclohexen-1-ylidene)-4,8-dimethyl-4,6,8-decatrien-1-yn-3-ol with a second approximately molar proportion of 8-(2,6,6-trimethyl-2-cylohexen-1-ylidene)-2,6-dimethyl-2,4,6-octatrien-1-al is effected by means of a metal-organic reaction. The preferred mode of execution comprises reacting 10-(2,6,6-trimethyl-2-cyclohexen-1-ylidene)-4,8-dimethyl-4,6,8-decatrien-1-yn-3-ol with approximately two molar proportions of lower alkyl magnesium halide in diethyl ether. The first molar proportion of lower alkyl magnesium halide reacts with the hydroxyl group, whereas the second molar proportion reacts with the acetylenic hydrogen and renders the terminal carbon atom of the carbinol reactive in the condensation. The dimagnesium halide compound formed is advantageously reacted in the same solvent with 8-(2,6,6-trimethyl-2-cyclohexen-1-ylidene)-2,6-dimethyl-2,4,6-octatrien-1-al. The condensation product is preferably hydrolyzed without further purification, by conventional expedients, for example by pouring into a mixture of ice and dilute sulfuric acid, thereby producing the above described 1,18-di-(2,6,6-trimethyl-2-cyclohexen-1-ylidene)-3,7,12,16-tetramethyl-8,11-dihydroxy - 2,4,6, - 12,14,16-octadecahexaen-9-yne.

In the second stage of the process according to the invention, 1,18-di-(2,6,6-trimethyl-2-cyclohexen-1-ylidene)-3,7,12,16-tetramethyl-8,11-dihydroxy-2,4,6,12,14,16 - octadecahexaen-9-yne is subjected to halogenation with accompanying allyl rearrangement. Suitable reagents for this purpose are solutions of hydrogen halides in inert solvents. The products formed are members of the class designated 4,4′-dihalo-15,15′-dehydro-$\beta$-carotene. A preferred mode of execution comprises treating 1,18-di-(2,6,6,-trimethyl-2-cyclohexen-1-ylidene)-3,7,12,16-tetra - methyl-8,11-dihydroxy-2,4,6,12,14,16-octadecahexaen - 9 - yne, in solution in diethyl ether, with aqueous hydrobromic acid at a temperature between about minus 20° C. and about 20° C., whereupon 4,4′-dibromo-15,15′-dehydro-$\beta$-carotene is precipitated after a short time.

In the third stage of the process according to the invention, 4,4′-dihalo-15,15′-dehydro-$\beta$-carotene is reacted to exchange the halogen atoms for hydroxy or acyloxy groups. This exchange can be effected, for example, by reacting the dihalo compound with an alkali metal salt of a lower alkanoic acid in an organic solvent, whereby the corresponding 4,4′-di(lower alkanoyloxy)-15,15′-dehydro-$\beta$-carotene is obtained. The latter, if desired, can then be hydrolyzed to 4,4′-dihydroxy-15,15′-dehydro-$\beta$-carotene. In an advantageous method of execution, 4,4′-dibromo-15,15′-dehydro-$\beta$-carotene is refluxed in glacial acetic acid with potassium acetate thereby producing 4,4′-diacetoxy-15,15′-dehydro-$\beta$-carotene. By mild alkaline saponification, 4,4′ - dihydroxy-15,15′-dehydro-$\beta$-carotene can be obtained from the latter. However, it is particularly advantageous to convert the 4,4′-dihalo-15,15′-dehydro-$\beta$-carotene directly into 4,4′-dihydroxy-15,15′-dehydro-$\beta$-carotene. To this end, in a preferred mode of execution, 4,4′-dihalo-15,15′-dehydro-$\beta$-carotene is stirred well with silver oxide and water, in an inert solvent such as benzene, for several hours at room temperature.

Before the fourth stage (described immediately below) of the process of the invention, it is often advantageous to oxidize 4,4′-dihydroxy-15,15′-dehydro-$\beta$-carotene to 4,4′-dioxo-15,15′-dehydro-$\beta$-carotene. This oxidation can be effected, for example, by treating 4,4′-dihydroxy-15,15′-dehydro-$\beta$-carotene in an inert solvent, e. g. methylene chloride or chloroform, with manganese dioxide, at any desired temperature between room temperature and the reflux temperature of the solvent. 4,4′-dioxo-15,15′-dehydro-$\beta$-carotene can be reconverted to 4,4′-dihydroxy-15,15′-dehydro-$\beta$-carotene by reduction with lithium aluminum hydride. The sequence of reactions comprising oxidation with manganese dioxide, crystallization of the dioxo compound obtained and subsequent reduction with lithium aluminum hydride can be advantageously employed for purification of 4,4′-dihydroxy-15,15′-dehydro-$\beta$-carotene.

In the fourth stage of the process according to the invention, 4,4′-disubstituted-15,15′-dehydro-$\beta$-carotene is partially hydrogenated catalytically at the triple bond. This selective hydrogenation can be accomplished according to methods known per se, by the use of selective hydrogenation catalysts and elemental hydrogen, in an organic solvent. A suitable selective hydrogenation catalyst is a palladium-on-calcium carbonate catalyst partially deactivated with lead and quinoline. An especially advantageous mode of execution of this fourth stage comprises effecting the hydrogenation in a hydrocarbon medium in which the 4,4′-disubstituted-15,15′-dehydro-$\beta$-carotene is only partially soluble. In this manner, the dehydro compound subjected to hydrogenation slowly goes into solution as the hydrogenation proceeds, the hydrogenation product being simultaneously precipitated from the hydrogenation mixture. In this manner there is obtained 4,4′ - disubstituted - 15,15′-mono-cis-$\beta$-carotene having a characteristic "cis peak" in the ultraviolet absorption spectrum. Thus, for example, 4,4′-dihydroxy-15,15′-mono-cis-$\beta$-carotene exhibits, in addition to the main maxima at 448 m$\mu$ and 475m$\mu$, a "cis peak" at 336 m$\mu$–337 m$\mu$ (in petroleum ether). Isolation of the hydrogenation product is not mandatory. The subsequent stage of isomerization (described immediately below) can be effected directly upon the suspension of the hydrogenation product.

In the fifth stage of the process according to the invention, the 4,4′-disubstituted-15,15′-mono-cis-$\beta$-carotene is isomerized to the corresponding all-trans compound. This isomerization may be effected, for example, by treatment with iodine, by irradiation or by heating. A particularly advantageous mode of execution comprises heating for several hours, at 80°–100° C., a suspension of the 4,4′-disubstituted-15,15′-mono-cis-$\beta$-carotene in a quantity of an organic liquid vehicle insufficient for the complete solution of the compound. As the isomerization progresses, the cis compound goes into solution and simultaneously the trans compound formed crystallizes out, so that an almost quantitative isomerization can be attained. If ester groups are present in the 4,4′-disubstituted-15,15′-mono-cis-$\beta$-carotene, they can, if desired, be saponified before isomerization. Furthermore, 4,4′-dihydroxy-15,15′-mono-cis-$\beta$-carotene can, if desired, be oxidized to 4,4′-dioxo-15,15′-mono-cis-$\beta$-carotene before isomerization.

A particularly advantageous mode of executing the invention comprises condensing 8 - (2,6,6 - trimethyl - 2 - cyclohexen - 1 - ylidene) - 2,6 - dimethyl - 2,4,6 - octatrien - 1 - al with acetylene thereby producing 1,18 - di - (2,6,6 - trimethyl - 2 - cyclohexen - 1 - ylidene) - 3,7,12,16 - tetramethyl - 8,11 - dihydroxy - 2,4,6,12,14,16 - octadecahexaen - 9 - yne; treating the latter with hydrogen halide thereby producing 4,4′ - dihalo - 15,15′ - dehydro - $\beta$ - carotene; hydrolyzing the latter thereby producing 4,4′-dihydroxy-15,15′-dehydro-$\beta$-carotene; reacting the latter with about one molar proportion of elemental hydrogen in the presence of a hydrogenation catalyst selective to catalyze the hydrogenation of an acetylenic bond only to the olefinic stage thereby producing 4,4′-dihydroxy-15,15′-mono-cis-$\beta$-carotene; and heating the latter thereby producing all-trans-4,4′-dihydroxy-$\beta$-carotene. Thus, a preferred embodiment of the invention comprises condensing acetylene with about two molar proportions of 8 - (2,6,6 - trimethyl - 2 - cyclohexen - 1 - ylidene) - 2,6 - dimethyl - 2,4,6 - octatrien - 1 - al thereby producing 1,18 - di - (2,6,6 - trimethyl - 2 - cyclohexen - 1 - ylidene) - 3,7,12,16 - tetramethyl - 8,11 - dihydroxy - 2,4,6,12,14,16 - octadecahexaen - 9 - yne; reacting the latter with concentrated aqueous hydrohalic acid selected from the group consisting of hydrochloric acid and hydrobromic acid thereby effecting halogenation with concomitant allyl rearrangement and thereby producing the corresponding 4,4′-dihalo-15,15′-dehydro-$\beta$-carotene; reacting the latter with a mild alkali thereby producing 4,4′-dihydroxy-15,15′-dehydro-$\beta$-carotene; reacting the latter with about one molar proportion of hydrogen in the presence of a hydrogenation catalyst selective to catalyze the hydrogenation of an acetylenic linkage only to the olefinic stage thereby producing 4,4′-dihydroxy-15,15′-mono-cis-$\beta$-carotene; and heating the latter thereby producing all-trans-4,4′-dihydroxy-$\beta$-carotene.

Products of the class 4,4′-disubstituted-all-trans-$\beta$-carotene produced according to the invention can be purified by crystallization, by partition between solvents or by chromatography. They can be stabilized, when necessary, by the addition of antioxidants, which latter can also be employed during the execution of the processes of the invention.

The 4,4'-disubstituted-all-trans-β-carotene products synthesized according to the invention are useful as coloring agents for incorporation in foodstuffs and feedstuffs. The compound 4,4'-dihydroxy-all-trans-β-carotene is particularly preferred for such use, e. g., for addition to butter, cheese, margarine, and the like, in order to impart a yellowish color thereto; and for incorporation in poultry feeds, in order to regularize the color of the yolks of eggs produced by flocks fed on the enriched feeds.

The invention is further disclosed in the following examples which are illustrative but not limitative thereof.

*Example 1*

30 g. of 4-(2,6,6-trimethyl-1-cyclohexen-1-yl)-2-methyl-2-buten-1-al in 210 g. of methylene chloride, together with 13.5 g. of sodium bicarbonate and 9 g. of calcium oxide, was cooled to 0° C., while stirring. Then 28 g. of N-bromosuccinimide was added, and the temperature was maintained for 3 hours at 5° to 10° C. by intermittent cooling. After some time the mixture assumed a yellow to red color, then slowly became colorless again. It was filtered, 30 g. of quinoline was added, and the methylene chloride was removed in vacuo. Again 30 g. of quinoline was added, and the mixture was warmed for 2 hours under nitrogen on a steam bath. 350 g. of petroleum ether (B. P. 30° to 60° C.) was added, and then the mixture was poured into 250 g. of 3 N sulfuric acid and ice, while stirring. The insoluble resin was filtered off and the aqueous layer was also removed; the residual petroleum-ether solution was washed with water, dilute sodium bicarbonate solution and then with water again. The washed petroleum ether solution was dried over sodium sulfate and concentrated, yielding 29.4 g. of crude 4 - (2,6,6 - trimethyl - 2 - cyclohexen - 1 - ylidene) - 2 - methyl - 2 - buten - 1 - al; this product was purified by distillation from a Hickman flask in a high vacuum; B. P. 90° C./0.03 mm. Hg.

*Example 2*

To a solution of 49.5 g. of 4 - (2,6,6 - trimethyl - 2 - cyclohexen - 1 - ylidene) - 2 - methyl - 2 - buten - 1 - al in 54 g. of ethyl orthoformate was added a solution of 1 ml. of orthophosphoric acid in 9 ml. of absolute ethyl alcohol, and the mixture was set aside for 15 hours at 20° to 25° C. Thereupon 10 g. of pyridine was added, and the mixture was poured into a mixture of 100 g. of 5% aqueous sodium bicarbonate solution and 60 g. of ice. The resulting mixture was extracted with petroleum ether, the extract was shaken with aqueous sodium bicarbonate solution and dried over potassium carbonate. The petroleum ether solution was concentrated, and the residue was freed in vacuo at 70° C. of excess ethyl orthoformate and of ethylformate produced by reaction, thereby yielding 70 g. of 4 - (2,6,6 - trimethyl - 2 - cyclohexen - 1 - ylidene) - 2 - methyl - 1,1 - diethoxy - 2 - butene; $n_D^{22}=1.5155$; absorption maximum in the ultraviolet spectrum at 284.5 m$\mu$ (in petroleum ether solution).

The latter product, without further purification, was condensed with ethyl vinyl ether. To this end, 3 ml. of a 10% solution of zinc chloride in ethyl acetate was added to the 70 g. of product above referred to, then 20 g. of ethyl vinyl ether and 18 ml. of a 10% solution of zinc chloride in ethyl acetate was added, simultaneously, while stirring, at 30° to 35° C., over a period of 2 hours. The stirring was continued 20 hours longer, at room temperature. The crude 6 - (2,6,6 - trimethyl - 2 - cyclohexen - 1 - ylidene) - 4 - methyl - 1,1,3 - triethoxy - 4 - hexene obtained in this manner was treated with a mixture of 240 ml. of glacial acetic acid, 12 g. of sodium acetate and 6 ml. of water, and heated for 6 hours in a nitrogen atmosphere at 95° C. Then it was cooled to 30° to 40° C. and poured into a mixture of 200 g. of ice and 200 ml. of water. The oily reaction product was extracted with petroleum ether, the extract was washed with 5% aqueous sodium bicarbonate solution and with water, and dried over sodium sulfate. After concentration of the petroleum ether solution, the residue was distilled in a high vacuum. There was obtained 61 g. of 6 - (2,6,6 - trimethyl - 2 - cyclohexen - 1 - ylidene) - 4 - methyl - 2,4 - hexadien - 1 - al as a mixture of isomers, B. P. about 125° C./0.02 mm. Hg. By crystallization from petroleum ether at minus 70° C., there was obtained a yellow crystalline form M. P.: 73°–74° C.; ultraviolet absorption maxima at 353 m$\mu$ and 372 m$\mu$; $E_1^1$=2360 and 2200 (in petroleum ether solution). A residual oily isomer was converted in part into the crystalline isomer by heating with acetic acid and sodium acetate at 95° C. for 5 hours; by repeated treatment of the mother liquor, practically the entire quantity was obtained in the form of the crystalline isomer.

*Example 3*

To a solution of 50 g. of 6-(2,6,6-trimethyl-2-cyclohexen-1-ylidene)-4-methyl-2,4-hexadien-1-al in 54 ml. of ethyl orthoformate was added a solution of 1 ml. of orthophosphoric acid in 9 ml. of absolute ethyl alcohol, and the mixture was set aside for 15 hours at 20° to 25° C. Then 10 ml. of pyridine was added and the mixture was poured into a mixture of 100 g. of 5% aqueous sodium bicarbonate solution and 60 g. of ice. The resulting mixture was extracted with petroleum ether, the extract was shaken with aqueous sodium bicarbonate solution and dried over potassium carbonate. Then the petroleum ether solution was concentrated, and the residue was freed from excess ethyl orthoformate and ethyl formate produced by reaction, in vacuo at 70° C. The residue consisted of 64 g. of 6-(2,6,6-trimethyl-2-cyclohexen - 1 - ylidene) - 4 - methyl - 1,1 - diethoxy - 2,4-hexadiene, $n_D^{23}$=1.5565, ultraviolet spectrum absorption maxima at 318 m$\mu$ and 332 m$\mu$ (in petroleum ether solution).

The latter product, without further purification, was condensed with ethyl propenyl ether: by adding 2 ml. of a 10% solution of zinc chloride in ethyl acetate to the 64 g. of product above referred to, then adding simultaneously, while stirring, at 30° to 35° C. and over a period of 2 hours, 20.5 g. of ethyl propenyl ether and 16 ml. of a 10% solution of zinc chloride in ethyl acetate; followed by stirring for an additional period of 20 hours at room temperature. The crude 8-(2,6,6-trimethyl - 2 - cyclohexen - 1 - ylidene) - 2,6 - dimethyl - 1,1,3-triethoxy-4,6-octadiene obtained in this manner was added to a mixture of 200 ml. of glacial acetic acid, 20 g. of sodium acetate and 10 ml. of water. The mixture was heated for 6 hours at 95° C. in a nitrogen atmosphere, then cooled to 30° to 40° C. and poured into a mixture of 200 g. of ice and 200 ml. of water. The oily reaction product was extracted with petroleum ether; the extract was washed with 5% aqueous sodium bicarbonate solution, then with water, and was finally dried over sodium sulfate. The petroleum ether solution was concentrated, and the residue was distilled in a high vacuum. There was obtained 58 g. of 8-(2,6,6-trimethyl-2 - cyclohexen - 1 - ylidene) - 2,6 - dimethyl - 2,4,6-octatrien-1-al, B. P.=145° to 150° C./0.02 mm. Hg; ultraviolet absorption maxima: 382 m$\mu$ and 403 m$\mu$; $E_1^1$=1615 and 1340 (in petroleum ether solution).

*Example 4*

16 g. of magnesium and 110 g. of n-hexyl bromide were reacted in 330 ml. of absolute diethyl ether, thereby forming an ethereal solution of n-hexyl magnesium bromide. This Grignard solution was stirred for 24 hours in an atmosphere of acetylene. Two layers were formed. The upper layer was separated off. The lower layer was washed once with 100 ml. of absolute diethyl ether, and to the washed material was added 200 ml. of absolute diethyl ether, and then a solution of 80 g. of 8-(2,6,6-trimethyl - 2 - cyclohexen - 1 - ylidene) - 2,6 - dimethyl-2,4,6-octatrien-1-al in 200 ml. of absolute diethyl ether was added quickly. The mixture was refluxed for 3 hours, while stirring, in a nitrogen atmosphere. Then the reaction mixture was cooled, poured into a mixture of 75 g. of ammonium chloride and 175 g. of ice, and the whole was stirred well for 10 minutes. The ether layer was separated and washed thrice, each time with 200 ml. of water, and the washed ethereal solution was dried over sodium sulfate. The ether was driven off, yielding 87 g. of yellow, resinous 1,18-di-(2,6,6-trimethyl-2 - cyclohexen - 1 - ylidene) - 3,7,12,16 - tetramethyl-8,11 - dihydroxy - 2,4,6,12,14,16 - octadecahexaen - 9-yne, having an absorption maximum in the ultraviolet spectrum at 349.5 m$\mu$ (in petroleum ether). Determination of active hydrogen according to Zerewitinoff showed two active hydrogen atoms.

*Example 5*

10 g. of 1,18-di-(2,6,6-trimethyl-2-cyclohexen-1-ylidene) - 3,7,12,16 - tetramethyl - 8,11 - dihydroxy - 2,4,6,12,14,16-octadecahexaen-9-yne in 80 ml. of diethyl ether was mixed within two minutes, at 0° C. and while stirring well, with 4 ml. of concentrated aqueous hydrobromic acid containing 60% by weight HBr, and the mixture was stirred 10 minutes longer at 0° C. Then the solid material was filtered off and washed with diethyl ether and water. 4,4'-dibromo-15,15'-dehydro-$\beta$-carotene was obtained as an orange-red powder having an absorption maximum in the ultraviolet spectrum at 430 m$\mu$ (in petroleum ether).

*Example 6*

6 g. of 4,4'-dibromo-15,15'-dehydro-$\beta$-carotene was dissolved in 180 ml. of benzene and shaken for 4 hours, at room temperature and in a carbon dioxide atmosphere, with 6 g. of silver oxide and 60 ml. of water. The silver oxide was then filtered off, the filtrate was dried over sodium sulfate, and the benzene was driven off. The residual 4,4'-dihydroxy-15,15'-dehydro-$\beta$-carotene was crystallized from a mixture of diethyl ether and petroleum ether; alternatively, a mixture of methylene chloride and methanol was used. The recrystallized material, a red, finely crystalline powder comprising essentially a mixture of stereoisomeric forms, had an unsharp melting point between 138°–142° C. and had two maxima in the ultraviolet spectrum at 430 m$\mu$ and 458 m$\mu$ (in petroleum ether).

*Example 7*

100 g. of 4,4'-dihydroxy-15,15'-$\beta$-carotene in 5000 ml. of toluene was shaken in a hydrogen atmosphere at 20° C. in the presence of 30 g. of palladium-lead-calcium carbonate catalyst [Lindlar, Helvetica Chimica Acta, 35, 450 (1952)] and 0.005 ml. of quinoline, until one mol of hydrogen was taken up. The catalyst was then filtered off and the solvent was removed in a high vacuum. The 4,4' - dihydroxy - 15,15' - mono - cis - $\beta$ - carotene obtained showed maxima in the ultraviolet spectrum at 336 m$\mu$–337 m$\mu$, 448 m$\mu$ and 475 m$\mu$ (in petroleum ether).

*Example 8*

1 g. of 4,4'-dihydroxy-15,15'-mono-cis-$\beta$-carotene in 3 ml. of petroleum ether (B. P. 70°–100° C.) was heated for 12 hours at 80° C. in a carbon dioxide atmosphere. Then the reaction mixture was filtered. The precipitate was recrystallized from a mixture of methylene chloride and petroleum ether (alternatively, from a mixture of methylene chloride and methanol). The all-trans-4,4'-dihydroxy-$\beta$-carotene thus obtained was a finely crystalline red powder having two absorption maxima in the ultraviolet spectrum at 452 m$\mu$ and 480 m$\mu$ (in petroleum ether), and melting at 145°–147° C. with decomposition.

*Example 9*

Dry, acetone-free acetylene was introduced into a solution of 3 g. of lithium in 1200 ml. of liquid ammonia, until there was no further reaction. Then, while stirring vigorously, a solution of 100 g. of 8-(2,6,6-trimethyl-2-cyclohexen-1-ylidene)-2,6-dimethyl-2,4,6-octatrien-1-al in 400 ml. of absolute diethyl ether was added over a period of 20 minutes, and the reaction mixture was stirred thoroughly for 20 hours, with precautions to exclude moisture. Thereupon 50 g. of ammonium chloride was added in small portions, and the ammonia was permitted to evaporate. 400 ml. of water was added, the ether layer was separated and washed with water, then dried over sodium sulfate and concentrated. The residual reddish oil was dried well in vacuo. There was obtained 108 g. of 10-(2,6,6-trimethyl-2-cyclohexen-1-ylidene)-4,8-dimethyl-4,6,8-decatrien-1-yn-3-ol as a viscous oil, having an absorption maximum in the ultraviolet spectrum at 349 m$\mu$ (in petroleum ether). Determination of active hydrogen according to Zerewitinoff showed, in the cold, one active hydrogen atom; and in the warm, two active hydrogen atoms.

The latter material (108 g.) was dissolved in 500 ml. of absolute diethyl ether and was added gradually, at 15°–20° C., while stirring, to a Grignard solution prepared from 18 g. of magnesium, 91 g. of ethyl bromide and 300 ml. of absolute diethyl ether. The reaction mixture was refluxed for one hour in a nitrogen atmosphere, then cooled with ice water. A solution of 92 g. of 8 - (2,6,6 - trimethyl - 2 - cyclohexen - 1 - ylidene)-2,6-dimethyl-2,4,6-octatrien-1-al in 400 ml. of absolute diethyl ether was added, at about 20° C., and the reaction mixture was refluxed for 3 to 4 hours in a nitrogen atmosphere. The reaction mixture was then poured into a mixture of 400 ml. of 3 N sulfuric acid and 600 g. of ice, the ether layer was separated and washed with 5% aqueous sodium bicarbonate solution, dried over sodium sulfate, and concentrated in vacuo, yielding 200 g. of resinous 1,18-di-(2,6,6-trimethyl-2-cyclohexen-1-ylidene)-3,7,12,16 - tetramethyl - 8,11 - dihydroxy - 2,4,6,12,14,16-octadecahexaen-9-yne.

*Example 10*

1 g. of 4,4' - dibromo - 15,15'-dehydro-$\beta$-carotene was heated with 15 ml. of glacial acetic acid and 2 g. of anhydrous potassium acetate, in a carbon dioxide atmosphere, for 2 hours at 100° C. The mixture was diluted with water, extracted with diethyl ether and the ethereal extract was washed thrice with water, then with dilute aqueous sodium bicarbonate solution. Upon drying the extract and driving off the ether therefrom, 4,4'-diacetoxy-15,15'-dehydro-$\beta$-carotene was obtained as a red, tough resin. Upon recrystallization from a mixture of methylene chloride and methanol, the material had M. P. 104°–122° C., U. V. max. at 430 m$\mu$ and 454 m$\mu$ (in petroleum ether).

This diacetoxy compound can be processed further, either by hydrolysis to 4,4'-dihydroxy-15,15'-dehydro-$\beta$-carotene, which can then be worked up further according to Examples 7 and 8; or alternatively, the diacetoxy compound can be selectively hydrogenated at the triple bond and isomerized to all-trans-4,4'-diacetoxy-$\beta$-carotene, generally in accordance with the procedures set forth in Examples 7 and 8. The latter can then be hydrolyzed to all-trans-4,4'-dihydroxy-$\beta$-carotene.

By using an appropriate acylating agent, other di(lower alkanoyloxy) esters of 4,4'-dihydroxy-15,15'-dehydro-$\beta$-carotene can be made, generally by the procedure of this example; and processed further as herein indicated.

*Example 11*

6 g. of crude 4,4'-dihydroxy-15,15'-dehydro-$\beta$-carotene was dissolved in 200 ml. of methylene chloride, 70 g. of manganese dioxide was added, and the mixture was shaken for 12 hours in a nitrogen atmosphere. Then the mixture was filtered, the filtrate was concentrated, the residue was taken up in benzene, and the benzene solution was mixed with low boiling petroleum ether until crystallization took place. The crystals obtained were recrystallized repeatedly from a mixture of methylene chloride and petroleum ether, thereby yielding violet needles of 4,4'- dioxo-15,15'-dehydro-β-carotene, M. P. 186°–188° C., U. V. max. 439 mμ (in petroleum ether).

This compound can be converted to all-trans-4,4'-dioxo-β-carotene by selective hydrogenation at the triple bond and isomerization, generally in accordance with the procedures of Examples 7 and 8.

We claim:

1. All-trans-4,4'-di-R-β-carotene, wherein R represents a member selected from the group consisting of hydroxy and lower alkanoyloxy.
2. All-trans-4,4'-dihydroxy-β-carotene.
3. 4,4'-di-R-mono-cis-β-carotene, wherein R represents a member selected from the group consisting of hydroxy and lower alkanoyloxy.
4. 4,4'-di-R-15,15'-dehydro-β-carotene, wherein R represents a member selected from the group consisting of hydroxy and lower alkanoyloxy.
5. 4,4'-dihalo-15,15'-dehydro-β-carotene.
6. 4,4'-dihydroxy-15,15'-dehydro-β-carotene.
7. 4,4'-diacetoxy-15,15'-dehydro-β-carotene.
8. 4,4'-dibromo-15,15'-dehydro-β-carotene.
9. 4,4'-dioxo-15,15'-dehydro-β-carotene.
10. 1,18-di-(2,6,6-trimethyl-2-cyclohexen-1-ylidene)-3,7,12,16-tetramethyl-8,11-dihydroxy-2,4,6,12,14,16-octadecahexaen-9-yne.
11. 10-(2,6,6-trimethyl-2-cyclohexen-1-ylidene)-4,8-dimethyl-4,6,8-decatrien-1-yn-3-ol.
12. A process which comprises condensing 8-(2,6,6-trimethyl-2-cyclohexen-1-ylidene)-2,6-dimethyl-2,4,6-octatrien-1-al with acetylene thereby producing 1,18-di-(2,6,6-trimethyl-2-cyclohexen-1-ylidene)-3,7,12,16-tetramethyl-8,11-dihydroxy-2,4,6,12,14,16-octadecahexaen-9-yne; treating the latter with hydrogen halide thereby producing 4,4'-dihalo-15,15'-dehydro-β-carotene; hydrolyzing the latter thereby producing 4,4'-dihydroxy-15,15'-dehydro-β-carotene; reacting the latter with about one molar proportion of elemental hydrogen in the presence of a hydrogenation catalyst selective to catalyze the hydrogenation of an acetylenic bond only to the olefinic stage thereby producing 4,4'-dihydroxy-15,15'-mono-cis-β-carotene; and heating the latter thereby producing all-trans-4,4'-dihydroxy-β-carotene.
13. A process which comprises condensing acetylene with about two molar proportions of 8-(2,6,6-trimethyl-2-cyclohexen-1-ylidene)-2,6-dimethyl-2,4,6-octatrien-1-al thereby producing 1,18-di-(2,6,6-trimethyl-2-cyclohexen-1-ylidene)-3,7,12,16-tetramethyl-8,11-dihydroxy-2,4,6,12,14,16-octadecahexaen-9-yne; reacting the latter with concentrated aqueous hydrohalic acid selected from the group consisting of hydrochloric acid and hydrobromic acid thereby effecting halogenation with concomitant allyl rearrangement and thereby producing the corresponding 4,4'-dihalo-15,15'-dehydro-β-carotene; reacting the latter with a mild alkali thereby producing 4,4'-dihydroxy-15,15'-dehydro-β-carotene; reacting the latter with about one molar proportion of hydrogen in the presence of a hydrogenation catalyst selective to catalyze the hydrogenation of an acetylenic linkage only to the olefinic stage thereby producing 4,4'-dihydroxy-15,15'-mono-cis-β-carotene; and heating the latter thereby producing all-trans-4,4'-dihydroxy-β-carotene.
14. A process which comprises condensing acetylene with 8-(2,6,6-trimethyl-2-cyclohexen-1-ylidene)-2,6-dimethyl-2,4,6-octatrien-1-al thereby producing 1,18-di-(2,6,6-trimethyl-2-cyclohexen-1-ylidene)-3,7,12,16-tetramethyl-8,11-dihydroxy-2,4,6,12,14,16-octadecahexaen-9-yne; treating the latter with hydrogen halide, thereby producing 4,4'-dihalo-15,15'-dehydro-β-carotene; treating the latter with a member of the group consisting of hydrolyzing reagents and lower alkanoylating agents, thereby producing the corresponding 4,4'-di-R-15,15'-dehydro-β-carotene, wherein R represents a member selected from the group consisting of hydroxy and lower alkanoyloxy; partially hydrogenating the latter at the triple bond, thereby producing 4,4'-di-R-mono-cis-β-carotene, wherein R has the same meaning previously indicated; and isomerizing the latter, thereby producing all-trans-4,4'-di-R-β-carotene, wherein R has the same meaning previously indicated.

References Cited in the file of this patent

UNITED STATES PATENTS 2,671,112   Inhoffen et al. _____ Mar. 2, 1954
2,680,755   Robeson et al. _____ June 8, 1954

OTHER REFERENCES

Inhoffen et al.: Chem. Abstracts, vol. 49, col. 8884 (1955), 1 p.

Inhoffen et al.: Ann., vol. 594 (1955), p. 170 (entire article pps. 165–176).

UNITED STATES PATENT OFFICE
Certificate of Correction

Patent No. 2,870,197 January 20, 1959

Otto Isler et al.

It is hereby certified that error appears in the printed specification of the above numbered patent requiring correction and that the said Letters Patent should read as corrected below.

Column 1, line 64, for "rearrangement;" read —rearrangement,—; column 2, line 23, strike out "for"; column 7, line 46, for "15,15'-β" read —15,15'-dehydro-β—; column 10, line 3, for "octodecahexaen" read —octadecahexaen—.

Signed and sealed this 5th day of May 1959.

[SEAL]

Attest:
KARL H. AXLINE,
Attesting Officer.

ROBERT C. WATSON,
Commissioner of Patents.